US012671151B2

(12) United States Patent　　　　(10) Patent No.:　US 12,671,151 B2
Uchida et al.　　　　　　　　　　　　(45) Date of Patent:　Jun. 30, 2026

(54) METAL-RESIN COMPOSITE AND METHOD FOR PRODUCING THE SAME

(71) Applicants:Prime Planet Energy & Solutions, Inc., Tokyo (JP); TOYOTA JIDOSHA KABUSHIKI KAISHA, Aichi-ken (JP); PRIMEARTH EV ENERGY CO., LTD., Shizuoka-ken (JP)

(72) Inventors: Yozo Uchida, Toyota (JP); Tsuyoshi Ehara, Toyota (JP); Yuki Sato, Toyota (JP); Syoichi Tsuchiya, Toyota (JP); Masataka Asai, Toyota (JP); Tsuyoshi Asano, Toyota (JP); Masahiro Uchimura, Toyota (JP); Yasuaki Nagano, Kosai (JP); Shigeru Matsumoto, Toyohashi (JP)

(73) Assignees: PRIME PLANET ENERGY & SOLUTIONS, INC., Tokyo (JP); TOYOTA JIDOSHA KABUSHIKI KAISHA, Aichi-Ken (JP); TOYOTA BATTERY .CO., LTD., Shizuoka-ken (JP)

( * ) Notice: Subject to any disclaimer, the term of this patent is extended or adjusted under 35 U.S.C. 154(b) by 199 days.

(21) Appl. No.: 18/395,625

(22) Filed: Dec. 25, 2023

(65) Prior Publication Data

US 2024/0283102 A1　　Aug. 22, 2024

(30) Foreign Application Priority Data

Feb. 21, 2023　(JP) ................................. 2023-025433

(51) Int. Cl.
　　*H01M 50/533*　　　(2021.01)
　　*B23K 26/342*　　　(2014.01)
　　　　　　　(Continued)

(52) U.S. Cl.
　　CPC ......... *H01M 50/533* (2021.01); *B23K 26/342* (2015.10); *H01M 50/534* (2021.01); *H01M 50/536* (2021.01)

(58) Field of Classification Search
　　CPC ............ B23K 26/342; H01M 10/0431; H01M 50/533; H01M 50/534; H01M 50/536; H01M 50/53
　　See application file for complete search history.

(56) References Cited

U.S. PATENT DOCUMENTS

2015/0224742 A1　8/2015　Inoue et al.
2016/0207148 A1　7/2016　Kobayashi et al.
　　　　　　　(Continued)

FOREIGN PATENT DOCUMENTS

JP　　2013-111881 A　　6/2013
JP　　2014-223781 A　　12/2014
　　　　　(Continued)

OTHER PUBLICATIONS

Kimura et al JP2018164989 (Year: 2017).*

*Primary Examiner* — Lawrence D Ferguson
(74) *Attorney, Agent, or Firm* — HAUPTMAN HAM, LLP

(57) ABSTRACT

A battery includes a unit member in which a positive-electrode resin member made of resin is joined to each of a lid and a positive terminal member, which are made of metal. The lid and the positive terminal member are formed, on respective surfaces, with protrusions that have an average diameter of less than 1 μm on a nano-order and are arranged in a densely reticulated arrangement. The resin forming the positive-electrode resin member intrudes into each gap between at least distal ends of the adjacent protrusions, so that the positive-electrode resin member is joined to at least the distal ends of the protrusions.

2 Claims, 11 Drawing Sheets

(51) Int. Cl.
    *H01M 50/534*        (2021.01)
    *H01M 50/536*        (2021.01)

(56)                References Cited

U.S. PATENT DOCUMENTS

| 2019/0232617 A1 | 8/2019 | Ishikawa et al. |
| 2022/0158279 A1 | 5/2022 | Kadoi |

FOREIGN PATENT DOCUMENTS

| JP | 5714193 | B1 | 5/2015 |
| JP | 2016020001 | A | 2/2016 |
| JP | 2017-056593 | A | 3/2017 |
| JP | 6103010 | B2 | 3/2017 |
| JP | 2018-066677 | A | 4/2018 |
| JP | 2022079172 | A | 5/2022 |
| WO | 2007/072603 | A1 | 6/2007 |

* cited by examiner

METAL-RESIN COMPOSITE AND METHOD FOR PRODUCING THE SAME

CROSS-REFERENCE TO RELATED APPLICATIONS

This application is based upon and claims the benefit of priority to Japanese Patent Application No. 2023-025433 filed on Feb. 21, 2023, the entire contents of which are incorporated herein by reference.

BACKGROUND

Technical Field

The present disclosure relates to a metal-resin composite and a method for producing the metal-resin composite.

Related Art

Metal-resin composites each consisting of a metal member and a resin member joined to each other have been known. To enhance the joining strength between the metal member and the resin member, for example, the surface of the metal member is roughened by a laser in advance and then the resin member is formed on the roughened surface of the metal member by insert molding. Such a conventional art is disclosed for example in Japanese unexamined patent application publication No. 2018-066677 (JP2018-066677A).

JP2018-066677A discloses that the surface of a metal member is formed with recesses having a nanometer-order depth and further formed with asperities each having a sub-micron-order or nanometer-order height or depth.

SUMMARY

Technical Problems

However, the conventional metal-resin composite has low joining strength between the metal member and the resin member, and thus has been desired to enhance the joining strength.

The disclosure has been made to address the above problems and has a purpose to provide a metal-resin composite with high joining strength and a method for producing the metal-resin composite.

Means of Solving the Problems

To achieve the above-mentioned purpose, one aspect of the disclosure provides a metal-resin composite in which a metal member and a resin member are joined together, wherein the metal member has a surface on which protrusions are formed with an average diameter of less than 1 μm on a nanometer order and arranged densely, resin that forms the resin member intrudes into each gap between distal ends of the adjacent protrusions of the metal member so that the resin member is joined to at least the distal ends of the protrusions of the metal member.

According to the metal-resin composite of the disclosure, the surface of the metal member is formed with the nanometer-order protrusions with an average diameter of less than 1 μm, which are arranged densely. The resin forming the resin member intrudes into the gaps between the distal ends of the adjacent protrusions, so that the resin is joined to at least the distal ends of the protrusions. This configuration can enhance the joining strength between the metal member and the resin member.

Another aspect of the disclosure provides a method for producing the metal-resin composite described above, the method comprising: forming the protrusions on the surface of the metal member by irradiating the metal member with a laser; and after forming the protrusions, insert-molding the resin member in a region where the protrusions are formed on the surface of the metal member.

BRIEF DESCRIPTION OF THE DRAWINGS

FIG. 2 is a cross-sectional view of the battery 1 cut along a line A-A in FIG. 1;

FIG. 11 is a schematic diagram showing an insert-molding process.

DETAILED DESCRIPTION OF THE EXEMPLARY EMBODIMENTS

A detailed description of an embodiment of this disclosure will now be given referring to the accompanying drawings. A battery 1, which constitute a metal-resin composite, is a rectangular, sealed lithium-ion secondary battery to be mounted in vehicles, such as hybrid cars, plug-in hybrid cars, and electric cars. In the following description, the reference signs X, Y, and Z in figures represent specific directions, that is, a right-left direction, a front-back direction, and an upper-lower direction, respectively. For each direction indicated by a double-headed arrow, the reference signs U, D, L, R, F, and B represent specific positions, i.e., an upper side, a lower side, a left side, a right side, a front side, and a back side, respectively. However, those directions and positions are merely identified for convenience of explanation and do not limit the orientation of the battery 1 to be installed.

Configuration of Battery

Figure 1:
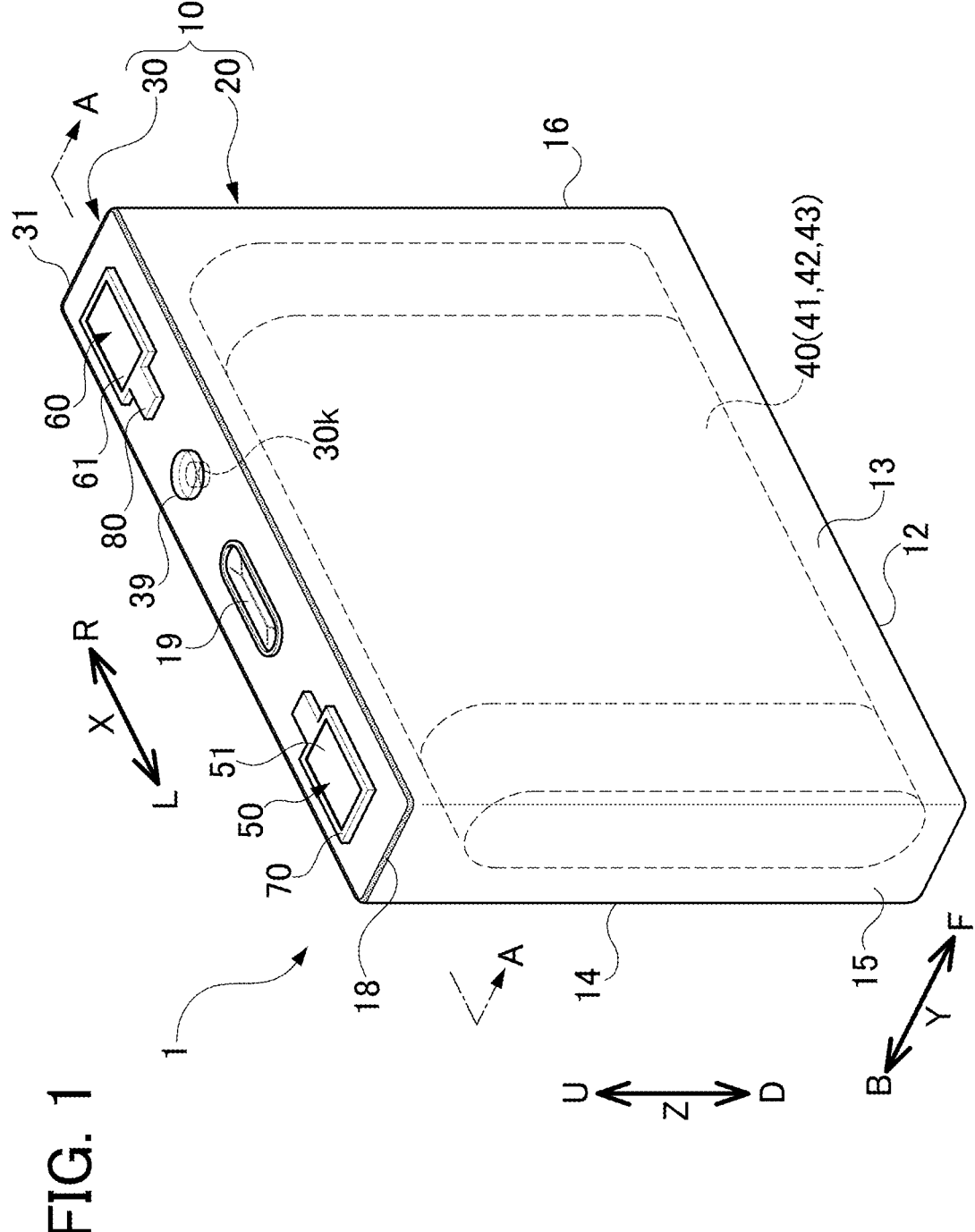
FIG. 1 is a perspective view of a battery in an embodiment.
Figure 2:
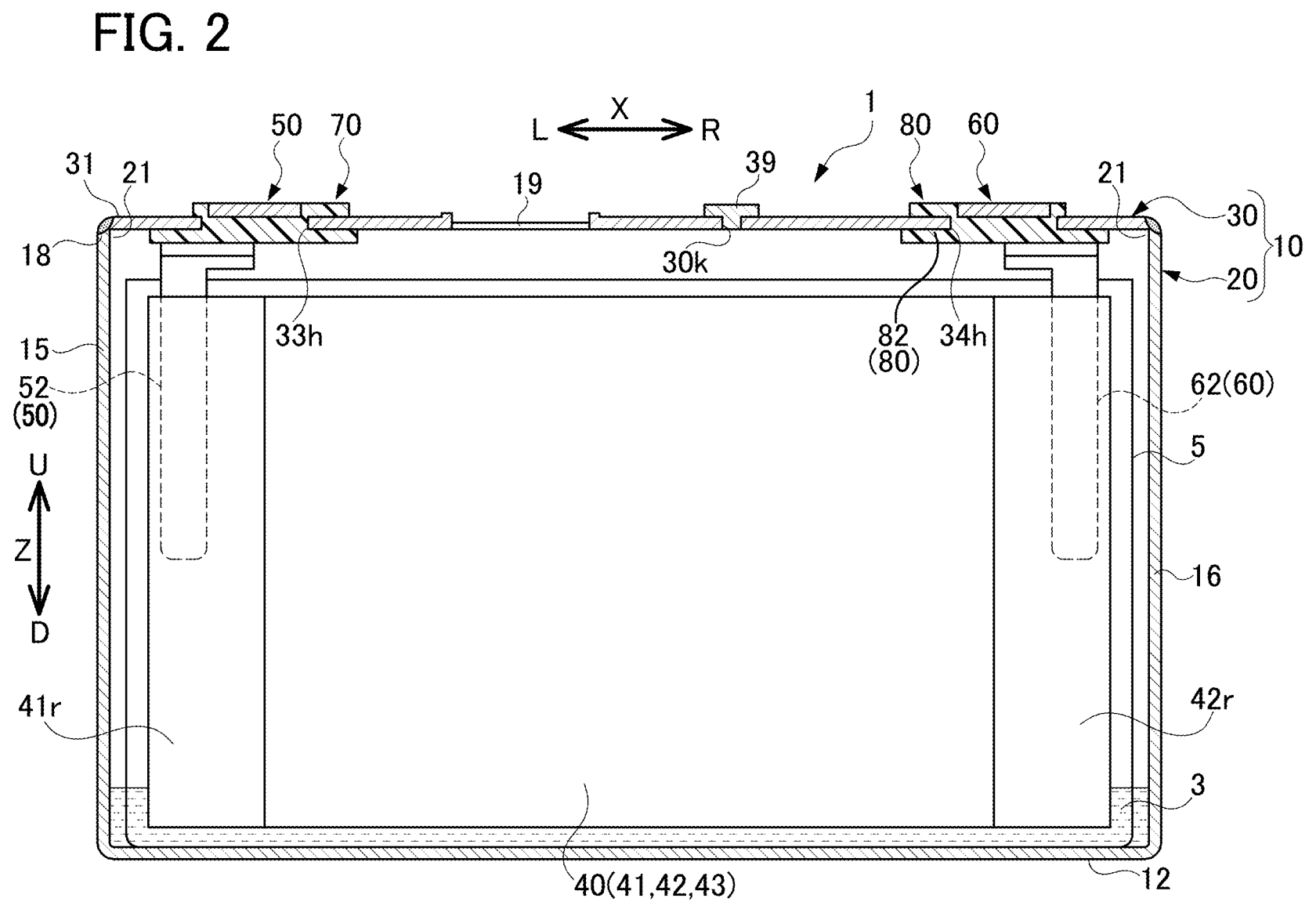

FIG. 1 is a perspective view of the battery 1. FIG. 2 is a cross-sectional view of this battery 1 cut along a line A-A in FIG. 1. As shown in FIGS. 1 and 2, the battery 1 includes a case 10 with a sealed interior, an electrode body 40 housed in the case 10, an electrolyte 3, an insulating holder 5, and a positive terminal member 50 and a negative terminal member 60 each connected to the electrode body 40.

The case 10 has an overall flat and bottomed rectangular parallelepiped shape. In this embodiment, the case 10 is made of aluminum. The material of the case 10 is not limited to aluminum, but is preferably metal. For example, this material of the case 10 may also be selected from any other metals, such as aluminum alloy, iron, and iron alloy. The case 10 consists of a case body 20 and a lid 30.

The case body 20 has a bottomed rectangular tube, or box, shape with an opening 21. In other words, the case body 20 includes a rectangular plate-shaped bottom 12, a pair of front side part 13 and back side part 14, extending vertically flat from the long edges of the bottom 12 on the front side F and the back side B respectively, and a pair of left side part 15 and right side part 16, extending vertically flat from the short edges of the bottom 12 on the left side L and the right side R. The opening 21 has a rectangular shape with a long side direction corresponding to the right-left direction X and a short side direction corresponding to the front-back direction Y. The bottom 12 has a rectangular plate shape with a long side direction corresponding to the right-left direction X and a short side direction corresponding to extending in the front-back direction Y. Each of the front side part 13 and the back side part 14 has a rectangular plate shape with a long side direction corresponding to the right-left direction X and a short side direction corresponding to the upper-lower direction Z. Each of the left side part 15 and the right side part 16 has a rectangular plate shape with a long side direction corresponding to the upper-lower direction Z and a short side corresponding to the front-back direction Y.

The height of each of the front side part 13 and the back side part 14, i.e., the length thereof in the upper-lower direction Z, is equal to the height of each of the left side part 15 and the right side part 16. The height of the front side part 13 and and the back side part 14 (i.e., the length thereof in the upper-lower direction Z) and the length of the front side part 13 and the back side part 14 in the right-left direction X are relatively longer than the length of the left side part 15 and the right side part 16 in the front-back direction Y. Therefore, in the following description, the right-left direction X, the front-back direction Y, and the upper-lower direction Z of the case 10, case body 20, and lid 30 are also referred to as a longitudinal direction, a width direction, and a height direction, respectively.

The lid 30 closes the opening 21 of the case body 20. In detail, a peripheral edge portion 31 of the lid 30 is laser-welded over its entire circumference to the ends of the front side part 13, back side part 14, left side part 15, and right side part 16 on the upper side U. At the boundary between the upper end of the case body 20 and the peripheral edge portion 31 of the lid 30, the case body 20 and the lid 30 are partially melted by laser and solidified, forming a melt-solidified portion 18 over the entire circumference.

The lid 30 is provided with a safety valve 19 at a position slightly to the left side L relative to the center in the right-left direction X. This safety valve 19 will break open when the internal pressure of the case 10 exceeds a valve opening pressure. The lid 30 is further formed with a liquid inlet 30k, extending through the lid 30 in the upper-lower direction Z, at a position slightly to the right side R relative to the center in the right-left direction X. A sealing member 39 made of aluminum is fitted in the liquid inlet 30k from above to hermetically seal the liquid inlet 30k.

The lid 30 is formed with an insertion hole 33h for a positive electrode, which will be referred to as a positive-electrode insertion hole 33h, extending through the lid 30 in the upper-lower direction Z, near an end on one side (i.e., on the left side L in FIGS. 1 and 2) in the right-left direction X. Further, the lid 30 is formed with an insertion hole 34h for a negative electrode, which will be referred to as a negative-electrode insertion hole 34h, extending through the lid 30 in the upper-lower direction Z, near an end on the other side (i.e., the right side R in FIGS. 1 and 2) in the right-left direction X. The positive-electrode insertion hole 33h and the negative-electrode insertion hole 34h are each formed in a rectangular shape with a long side direction corresponding to the right-left direction X and a short side direction corresponding to the front-back direction Y. In the positive-electrode insertion hole 33h, a positive terminal member 50 having an overall vertically-long shape (extended in one direction) is inserted from the upper side U along its longwise direction. In the negative-electrode insertion hole 34h, a negative terminal member 60 having an overall vertically-long shape (extended in one direction) is inserted from the upper side U along its longwise direction.

The positive terminal member 50 is fixed to the lid 30 while being insulated from the lid 30 via a resin member 70 for a positive electrode, which will be referred to as a positive-electrode resin member 70. Thus, the positive terminal member 50 is supported by the lid 30 via the positive-electrode resin member 70. In this embodiment, the positive terminal member 50 is made of aluminum. However, the material of the positive terminal member 50 may be appropriately selected from any materials that can be electrically connected to a positive current collecting part 41r of the electrode body 40, which will be mentioned later.

The negative terminal member 60 is fixed to the lid 30 while being insulated from the lid 30 via a resin member 80 for a negative electrode, which will be referred to as a negative-electrode resin member 80. Thus, the negative terminal member 60 is supported by the lid 30 via the negative-electrode resin member 80. In this embodiment, the negative terminal member 60 is made of copper. However, the material of the negative terminal member 60 may be appropriately selected from any materials that can be electrically connected to a negative current collecting part 42r of the electrode body 40, which will be mentioned later.

The electrode body 40 is a so-called wound electrode body. In this electrode body 40, a strip-shaped positive electrode sheet 41 and a strip-shaped negative electrode sheet 42 are wound together in a predetermined winding direction while alternately interposing strip-shaped separators 43 therebetween. The resultant electrode body 40 has an overall flat shape including side surfaces on the front side F and the back side B, each having a rectangular horizontal shape extending in the upper-lower direction Z and the right-left direction X.

The positive electrode sheet 41 includes a positive current collecting foil (not shown) and a positive active material layer (not shown) formed on this foil. The positive current collecting foil in the embodiment is made of aluminum, but may be appropriately selected from any materials that can function as the positive electrode of a lithium-ion secondary battery. On the other hand, the negative electrode sheet 42 includes a negative current collecting foil (not shown) and a negative active material layer (not shown) formed on this foil. The negative collecting foil in the embodiment is made of copper, but may be appropriately selected from any materials that can function as the negative electrode of a lithium-ion secondary battery.

The electrode body 40 includes the positive current collecting part 41r in which the positive current collecting foil is exposed. To this positive current collecting part 41r, a positive terminal lower part 52 of the positive terminal member 50 is joined. Similarly, the electrode body 40 further includes the negative current collecting part 42r in which the negative current collecting foil is exposed. To this negative current collecting part 42r, a negative terminal lower part 62 of the negative terminal member 60 is joined. Accordingly, the electrode body 40 is supported by the lid 30 via the positive terminal member 50 and the negative terminal member 60.

Although detailed illustrations are omitted in the figures, the positive current collecting part 41r is a wound part of only the positive current collecting foil protruding in the axial direction of the electrode body 40 from the overlapping negative electrode sheet 42 and separators 43. Similarly, the negative current collecting part 42r is a wound part of only the negative current collecting foil protruding in the axial direction of the electrode body 40 from the overlapping positive electrode sheet 41 and separators 43. In this embodiment, the positive current collecting part 41r is located at one end of the electrode body 40 on the left side L, while the negative current collecting part 42r is located at the other end of the electrode body 40 on the right side R.

Further, the electrode body 40 is spaced at constant distances from the bottom 12, front side part 13, back side part 14, left side part 15, and right side part 16 of the case body 20, and the lid 30. Between the electrode body 40 and the case body 20, the insulating holder 5 is located to reliably maintain the insulation therebetween. The shape and the material of the insulating holder 5 may be appropriately selected from any shapes and materials that allow the insulating holder 5 to be placed between the electrode body 40 and the case body 20 and to insulate between them. In this embodiment, the insulating holder 5 is produced from a strip-shaped film made of polypropylene (PP), which is a synthetic resin, and formed in a pouch shape with an opening on the upper side U, in which the electrode body 40 is enclosed. Specifically, the insulating holder 5 insulates the outer surfaces of the electrode body 40 facing the case body 20 from the inner surfaces of the bottom 12, front side part 13, back side part 14, left side part 15, and right side part 16 of the case body 20.

The positive-electrode resin member 70 is made of thermoplastic resin, specifically, polyphenylene sulfide (PPS) in the embodiment. The positive-electrode resin member 70 is joined to each of the lid 30 and the positive terminal member 50. Since the positive-electrode resin member 70 is joined to the lid 30 and the positive terminal member 50, these lid 30, positive terminal member 50, and positive-electrode resin member 70 are integrated as a unit. Thus, the battery 1 including this integrated unit constitutes a metal and resin composite. The positive-electrode resin member 70 hermetically seals while insulating between the lid 30 and the positive terminal member 50. Specifically, the positive-electrode resin member 70 functions as both a member for insulating and a member for sealing between the lid 30 and the positive terminal member 50. The material of the positive-electrode resin member 70 may be appropriately selected from any materials that can hermetically seal and insulate between the lid 30 and the positive terminal member 50 and further can be joined to each of the lid 30 and the positive terminal member 50, e.g., another type of thermoplastic resin or other types of resins such as thermosetting resin.

The negative-electrode resin member 80 is made of thermoplastic resin, specifically, polyphenylene sulfide (PPS) in the embodiment. The negative-electrode resin member 80 is joined to each of the lid 30 and the negative terminal member 60. Since the negative-electrode resin member 80 is joined to the lid 30 and the negative terminal member 60, these lid 30, negative terminal member 60, and negative-electrode resin member 80 are integrated as a unit. Thus, the battery 1 including this integrated unit constitutes a metal and resin composite. The negative-electrode resin member 80 hermetically seals and insulates between the lid 30 and the negative terminal member 60. Specifically, the negative-electrode resin member 80 functions as a member for insulating and a member for sealing between the lid 30 and the negative terminal member 60. The material of the negative-electrode resin member 80 may be selected from any materials that can hermetically seal and insulate between the lid 30 and the negative terminal member 60 and further can be joined to each of the lid 30 and the negative terminal member 60, e.g., another type of thermoplastic resin or other types of resins such as thermosetting resin.

Figure 3:
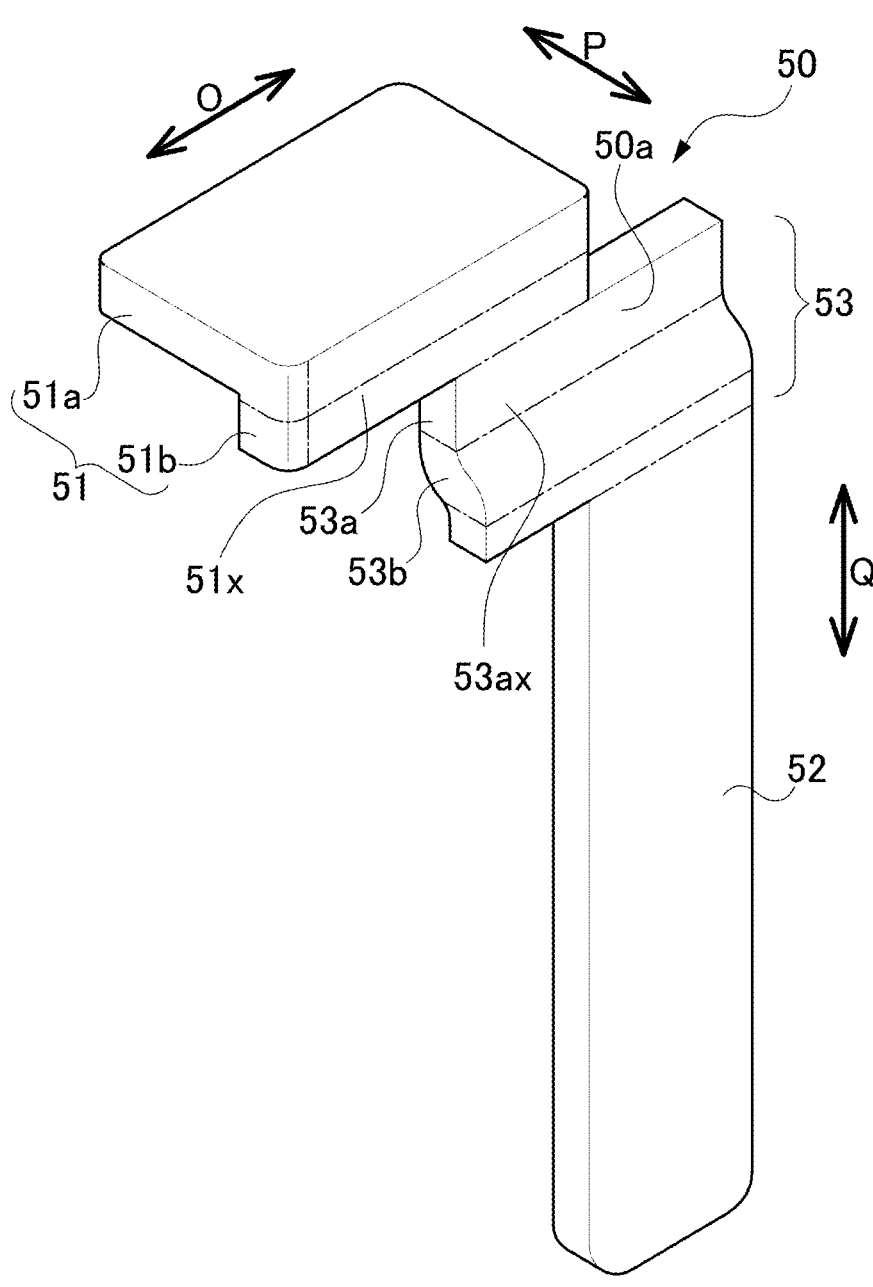
FIG. 3 is a perspective view of a positive terminal member.

Next, the shape of the positive terminal member 50 will be described in detail below. FIG. 3 is a perspective view of the positive terminal member 50. As shown in FIG. 3, the positive terminal member 50 includes a positive terminal upper part 51, a positive terminal lower part 52, and a positive terminal middle part 53. In the battery 1, the positive terminal upper part 51 is located relatively to the upper side U and the positive terminal lower part 52 is located relatively to the lower side D.

The positive terminal upper part 51 has an L-shaped cross-sectional shape constant in one direction. This cross-sectional shape of the upper part 51 is of an L shape with two straight sections, one is longer than the other. Therefore, of the positive terminal upper part 51, a rectangular plate-shaped portion corresponding to the longer straight section of the L-shaped cross-sectional shape is referred to as a long straight portion 51a, and a portion vertically extending from one edge of the long straight portion 51a is referred to as a short straight portion 51b.

In the following description, the positive terminal member 50 is described referring to the reference signs O, P, and Q each representing specific directions for convenience. To be specific, O denotes the direction in which the L-shaped cross-sectional shape of the positive terminal upper part 51 remains constant, P denotes the direction parallel to the longer straight section of the L-shaped cross-sectional shape of the positive terminal upper part 51, and Q denotes the direction parallel to the shorter straight section of the L-shaped cross-sectional shape of the positive terminal upper part 51. Hereinafter, the signs O, P, and Q denoting the specific directions as above will also be referred to as a first direction O, a second direction P, and a third direction Q. Further, for explanation of the positive terminal member 50, one side in the third direction Q where the positive terminal upper part 51 is located may be referred to as an upper side, and the other side in the third direction Q where the positive terminal lower part 52 is located may be referred to as a lower side.

The positive terminal lower part 52 is formed entirely perpendicular to the long straight portion 51*a* and has a rectangular plate shape with a long side direction corresponding to the third direction Q and a short side direction corresponding to the second direction P. In the first direction O, a part of the positive terminal lower part 52 is located within the positive terminal upper part 51, but the rest part protrudes outside the positive terminal upper part 51. In the second direction P, a part of the positive terminal lower part 52 is located within the positive terminal upper part 51, but the rest part protrudes outside the positive terminal upper part 51.

The positive terminal middle part 53 has an overall crank shape that connects the positive terminal upper part 51 and the positive terminal lower part 52. When seen in the second direction P, the positive terminal middle part 53 has a rectangular shape with a long side direction corresponding to the first direction O and a short side direction corresponding to the third direction Q. The length of the positive terminal middle part 53 in the first direction O is longer than the length of the positive terminal lower part 52 in the first direction O. The side surface of the positive terminal lower part 52 at the protruding side from the positive terminal upper part 51 in the first direction O is continuous to, i.e., flush with, the side surface of the positive terminal middle part 53 on the same side.

Both surfaces of the positive terminal middle part 53, located near the short straight portion 51*b* and extending perpendicular to the second direction P, are flush with both surfaces of the short straight portion 51*b* perpendicular to the second direction P. Hereinafter, the portion of the positive terminal middle part 53, flush with the both surfaces of the short straight portion 51*b* perpendicular to the second direction P, will be referred to as an upper joining portion 53*a*. Further, the side surface 51*x* of the positive terminal upper part 51 including the short straight portion 51*b*, on the side where the positive terminal lower part 52 is located in the second direction P, is flush with the surface 53*ax* of the upper joining portion 53*a* on the same side. On the opposite side of the upper joining portion 53*a* in the third direction Q from the short straight portion 51*b*, a bent portion 53*b* is formed in a crank shape bending outward in the second direction P relative to the positive terminal upper part 51.

In this embodiment, the shape of the negative terminal member 60 is identical to that of the positive terminal member 50. Accordingly, the details of the negative terminal member 60 are not described using a perspective view, but this negative terminal member 60 includes, as with the positive terminal member 50, a negative terminal upper part 61, a negative terminal lower part 62, and a negative terminal middle part 63, which are respectively identical to the positive terminal upper part 51, the positive terminal lower part 52, and the positive terminal middle part 53.

Figure 4:
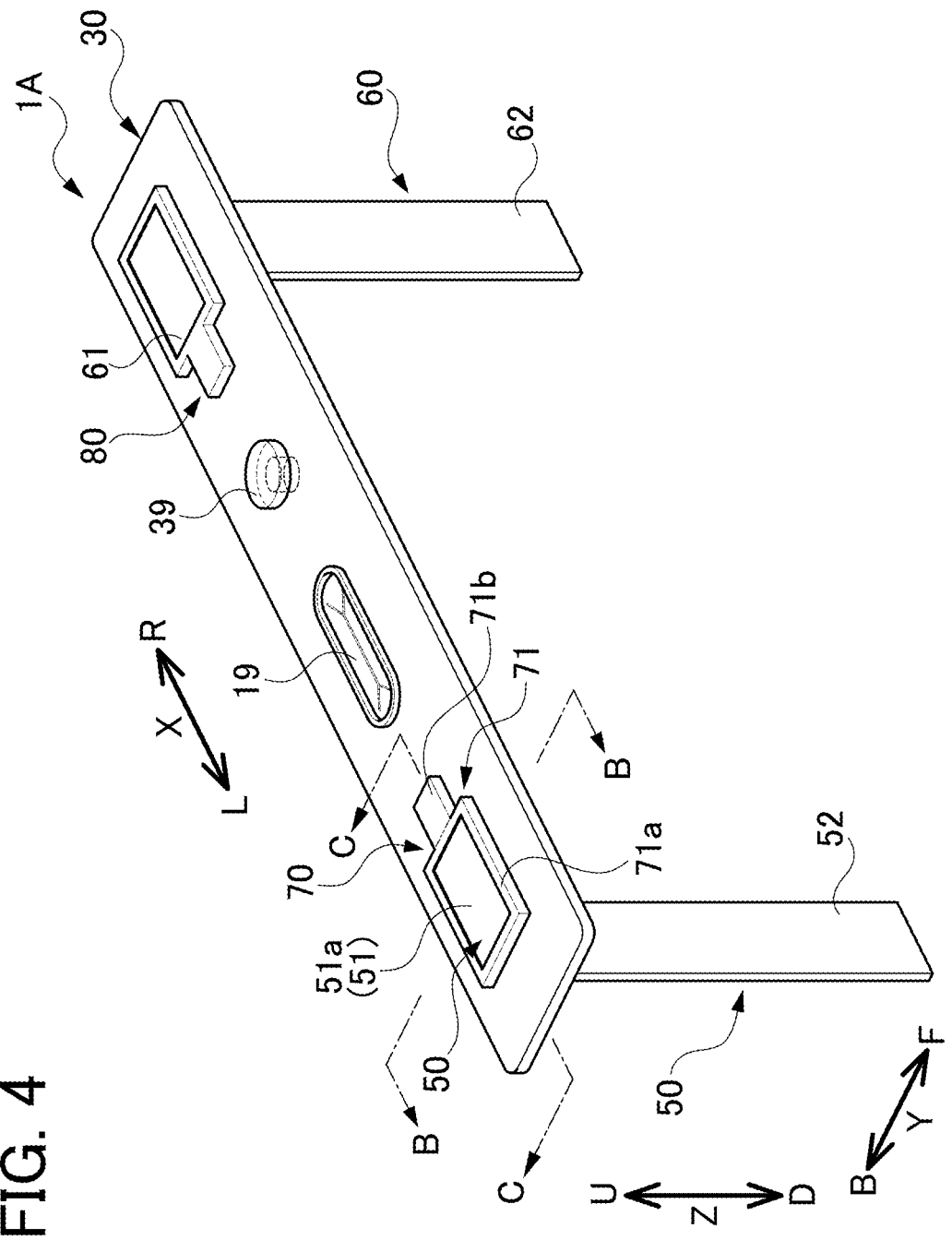
FIG. 4 is a perspective view of a unit member extracted from the battery in FIG. 1.
Figure 5A:
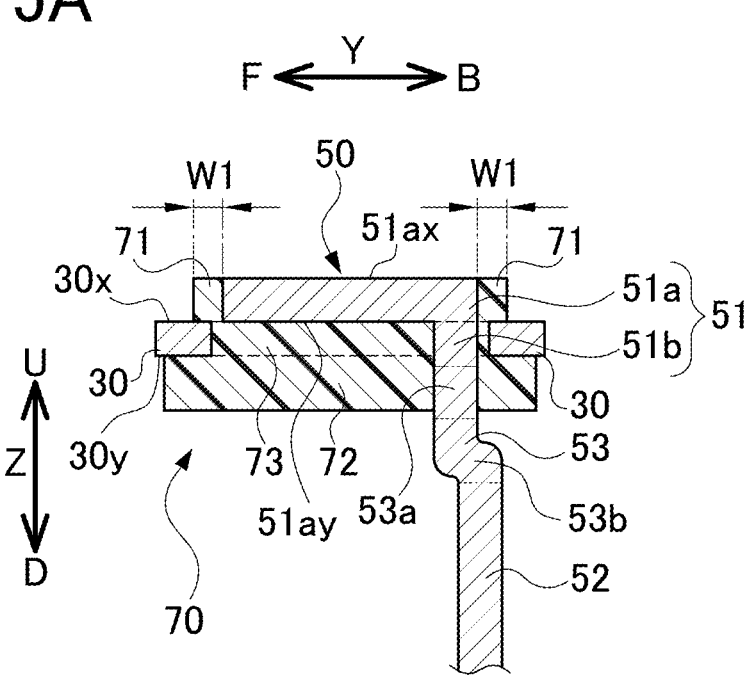
FIG. 5A is a cross-sectional view of the unit member cut along a line B-B in FIG. 4.
Figure 5B:
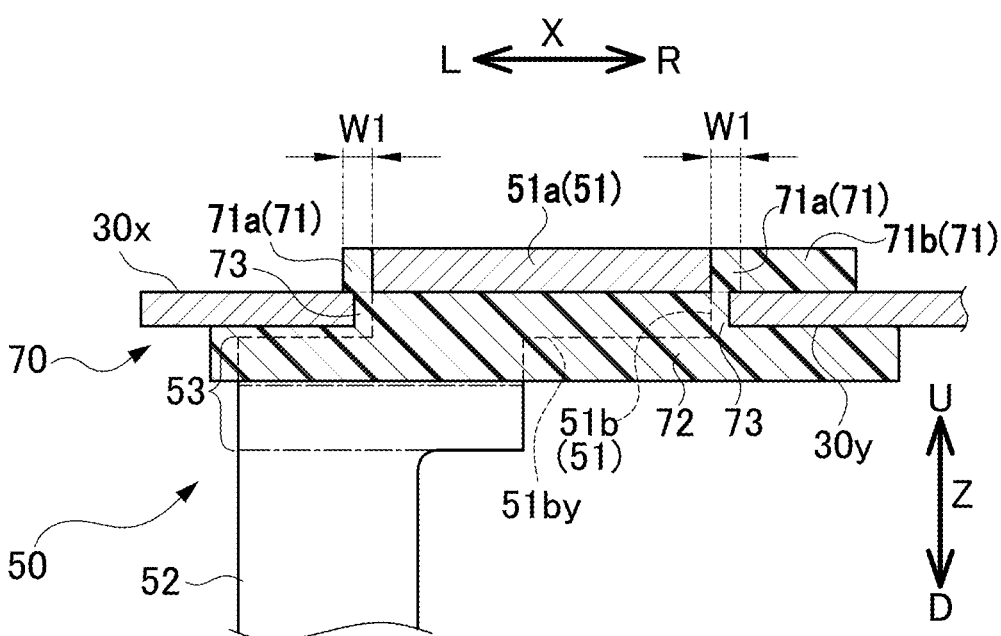
FIG. 5B is a cross-sectional view of the unit member cut along a line C-C in FIG. 4.
Figure 6A:
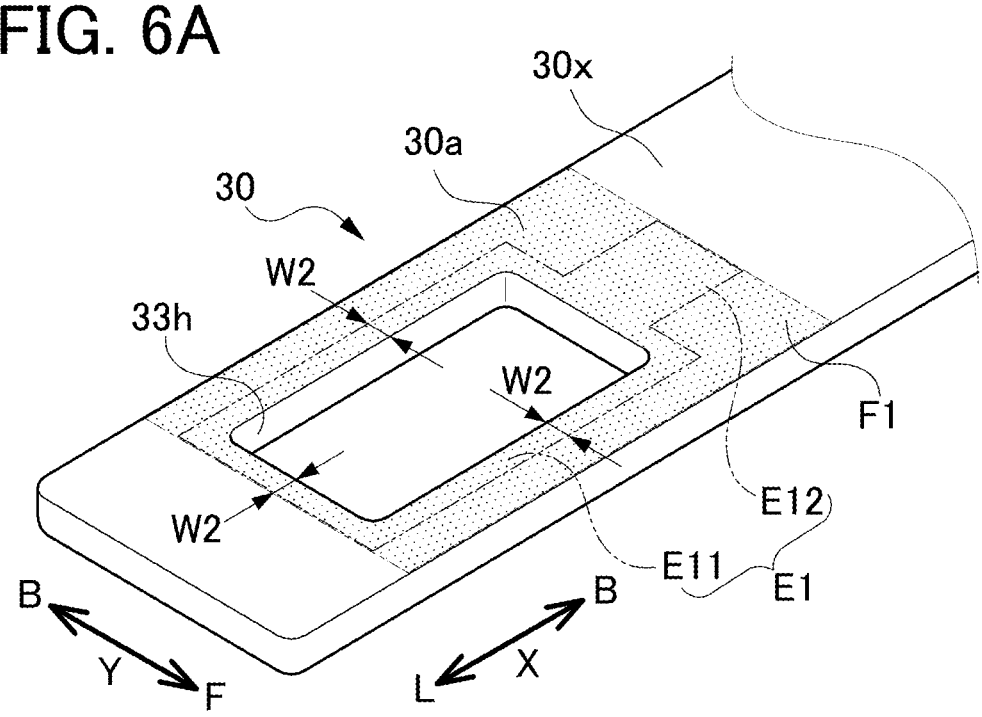
FIG. 6A is an explanatory view showing a joining region between an upper surface of a lid and a positive-electrode resin member and a roughened region on the upper surface of the lid.
Figure 6B:
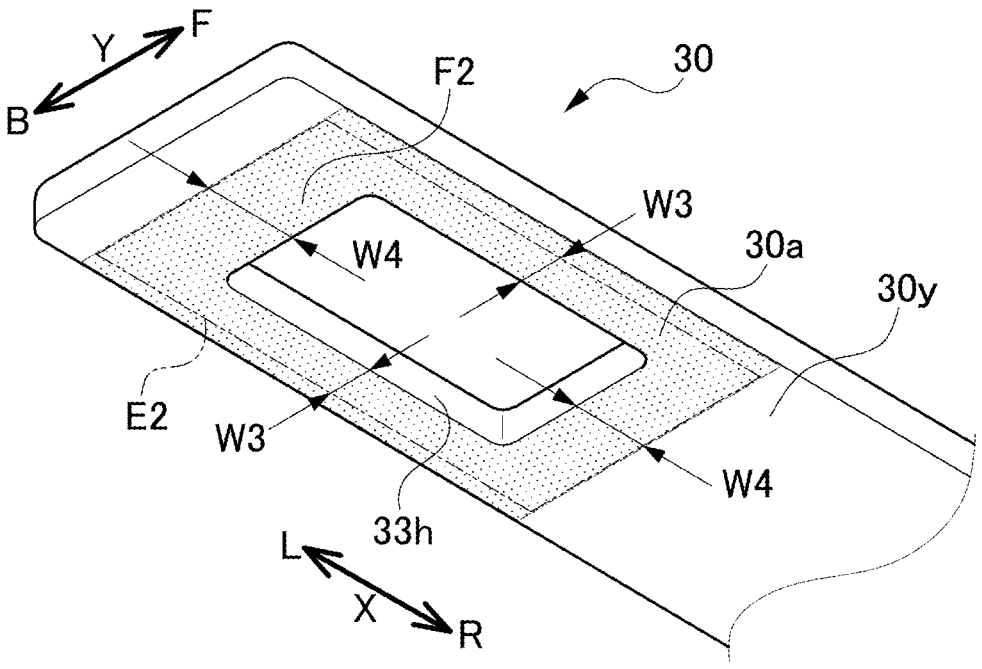
FIG. 6B is an explanatory view showing a joining region between a lower surface of the lid and the positive-electrode resin member and a roughened region on the lower surface of the lid.
Figure 7A:
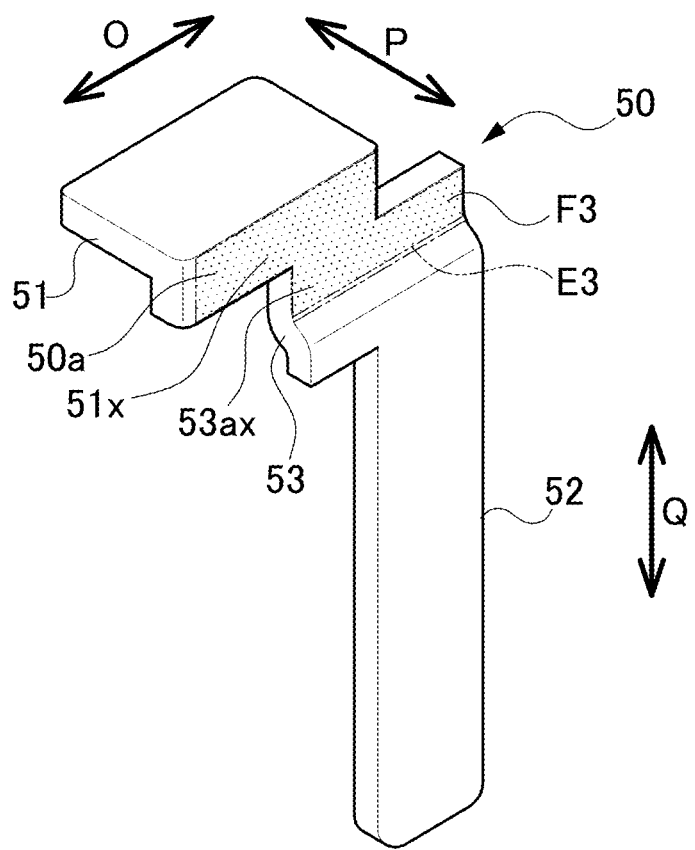
FIG. 7A is an explanatory view showing a joining region between a side surface of a part of the positive terminal member and the positive-electrode resin member and a roughened region on the side surface of the part of the positive terminal member.
Figure 7B:
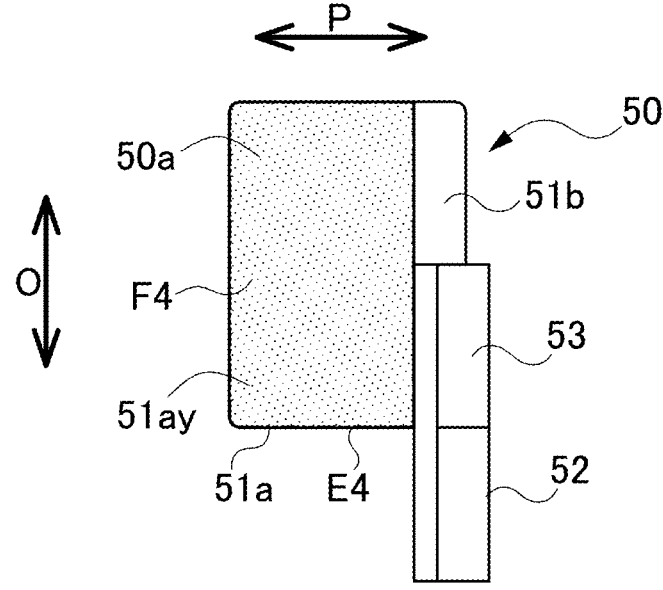
FIG. 7B is an explanatory view showing a joining region between a lower surface of a long straight portion of the positive terminal member and the positive-electrode resin member and a roughened region on the lower surface of the long straight portion of the positive terminal member.

The joining structure of the positive-electrode resin member 70 to the lid 30 and the positive terminal member 50, and the process of roughening the lid 30 and the positive terminal member 50 will be described below. FIG. 4 is a perspective view showing a unit member 1A, which is a part of the battery 1 shown in FIGS. 1 and 2, and includes the lid 30 integrated with the positive terminal member 50 and the positive-electrode resin member 70, and the negative terminal member 60 and the negative-electrode resin member 80. FIG. 5A is a cross-sectional view of the unit member 1A cut along a line B-B in FIG. 4 and FIG. 5B is a cross-sectional view of the same cut along a line C-C in FIG. 4. FIGS. 6A and 6B are explanatory diagrams showing the joining regions between the lid 30 and the positive-electrode resin member 70 and the roughened regions of the lid 30 subjected to the roughening process. FIGS. 7A and 7B are explanatory diagrams showing the joining regions between the positive terminal member 50 and the positive-electrode resin member 70 and the roughened regions of the positive terminal member 50 subjected to the roughening process.

The positive terminal member 50 is fixed to the lid 30 via the positive-electrode resin member 70 so that the first direction O is parallel to the right-left direction X and the positive terminal lower part 52 is placed on the back side B. On the other hand, the negative terminal member 60 is fixed to the lid 30 via the negative-electrode resin member 80 so that the first direction O is parallel to the right-left direction X and the negative terminal lower part 62 is placed on the front side F.

The upper surface 51*ax* of the long straight portion 51*a* is exposed on the upper side U. The upper surface 30*x* of the lid 30 and the lower surface 51*ay* of the long straight portion 51*a* are located on almost the same level in the upper-lower direction Z. Furthermore, the lower surface 51 by of the short straight portion 51*b* is located slightly below the lower surface 30*y* of the lid 30 in the upper-lower direction Z. In a plan view, i.e., when viewed from the upper side U toward the lower side D, the long straight portion 51*a* of the positive terminal member 50 inserted in the positive-electrode insertion hole 33*h* is located just inside the positive-electrode insertion hole 33*h*. In the right-left direction X and the front-back direction Y, the long straight portion 51*a* is located at almost the center of the positive-electrode insertion hole 33*h*.

The positive-electrode resin member 70 is formed extending from the upper end of the positive terminal upper part 51 to slightly above the lower end of the upper joining portion 53*a* in the upper-lower direction Z. This positive-electrode resin member 70 hermetically seals the space between the lid 30 and the positive terminal member 50. In this embodiment, the positive-electrode resin member 70 is integrally formed by insert molding, as described below. For convenience, the portion of this resin member 70 located above the upper surface 30*x* of the lid 30 is referred to as a positive-resin upper portion 71, the portion of the same located below the lower surface 30*y* of the lid 30 is referred to as a positive-electrode lower portion 72, and the portion of the same located between the upper surface 30*x* and the lower surface 30*y* of the lid 30, that is, the portion filling the positive-electrode insertion hole 33*h*, is referred to as a positive-electrode middle portion 73.

The positive-resin upper portion 71 includes a positive-resin upper frame portion 71*a* surrounding all around the long straight portion 51*a* and a positive-resin upper projecting portion 71*b* continuous to the upper frame portion 71*a*.

The positive-resin upper frame portion 71*a* is formed in a rectangular frame shape in plan view. The first width W1 of this upper frame portion 71*a*, from the inner edge to the outer edge, is approximately equal between the straight portions. The positive-resin upper projecting portion 71*b* is formed protruding on the right side R from an almost central part of the straight portion of the upper frame portion 71*a* on the right side R. The upper projecting portion 71*b* has a rectangular plate shape with a long side direction corresponding to the right-left direction X and a short side direction corresponding to the front-back direction Y. The lengths of the upper projecting portion 71*b* in the right-left direction X and in the front-back direction Y are longer than the first width W1. This upper projecting portion 71*b* is formed at a position to which a gate member GT (see FIG. 11) for injection of molten resin is disposed facing during insert molding.

The positive-resin upper frame portion 71a is joined to all the outer side surfaces of the long straight portion 51a and to a joining region E11 having a rectangular ring shape on the upper surface 30x of the lid 30, which will be referred to as a lid upper-surface frame-shaped joining region E11, surrounding the edge of the positive-electrode insertion hole 33h over the entire circumference of. The second width W2 of this joining region E11, from the inner edge to the outer edge, is almost equal between the straight portions thereof. The positive-resin upper projecting portion 71b is joined, over its entire bottom surface, to the upper surface 30x of the lid 30.

In the following description, the region on the upper surface 30x of the lid 30 joined to the positive-resin upper projecting portion 71b is referred to as a lid upper-surface rectangular joining region E12. This joining region E12 is formed protruding on the right side R from almost the center part of the straight portion of the lid upper-surface frame-shaped joining region E11 on the right side R. Thus, the lid upper-surface frame-shaped joining region E11 and the lid upper-surface rectangular bonding region E12 are continuous and constitute a bonding region with the positive-electrode resin member 70 on the upper surface 30x of the lid 30. Therefore, those bonding regions E11 and E12 are referred together to as a lid upper-surface bonding region E1.

The positive-resin lower portion 72 is formed wholly in a rectangular plate shape with a long side direction corresponding to the right-left direction X and a short side direction corresponding to the front-back direction Y. In this lower portion 72, a part of the positive terminal member 50, overlapping with the lower portion 72 in the upper-lower direction Z, is completely embedded. Thus, the lower portion 72 is joined to all the outer side surfaces of the overlapping part of the short straight portion 51b and the upper joining portion 53a of the positive terminal member 50 in the upper-lower direction Z.

The positive-resin lower portion 72 is joined to a joining region E12 having a rectangular ring shape on the lower surface 30y of the lid 30a, which will be referred to as a lid lower-surface joining region E2, surrounding the edge of the positive-electrode insertion hole 33h over the entire circumference. For the distances from the inner edges to the outer edges of the straight portions of the joining region E2, the distances on the front side F and the back side B are almost equal and the distances on the left side L and the right side R are almost equal. Further, the fourth width W4 of this joining region E2, which is the distance from the inner edge to the outer edge of each straight portion on the left side L and the right side R is wider than the third width W3 of the joining region E2, which is the distance from the inner edge to the outer edge of each straight portion on the front side F and the back side B.

The positive-resin middle portion 73 is continuous to both the positive-resin upper portion 71 and the positive-resin lower portion 72. This middle portion 73 is joined to all the inner side surfaces of the positive-electrode insertion hole 33h in the lid 30. Furthermore, in the middle portion 73, a part of the short straight portion 51b of the positive terminal member 50, overlapping with the middle portion 73 in the upper-lower direction Z is completely embedded. Thus, the middle portion 73 is joined to all the outer side surfaces of the overlapping part of the short straight portion 51b of the positive terminal member 50 in the upper-lower direction Z.

All the outer side surfaces of the long straight portion 51a of the positive terminal member 50 are joined to the positive-resin upper frame portion 71a. Of the positive terminal member 50, an overlapping part of the short straight portion 51b with the positive-resin middle portion 73 and an overlapping part of the upper joining portion 53a with the positive-resin lower portion 72 in the upper-lower direction Z are joined, over their outer side surfaces, to those middle portion 73 and lower portion 72. Therefore, in the positive terminal member 50, part of the side surfaces of the positive terminal upper part 51 and the upper joining portion 53a, which are continuous and flush with each other, and joined to the positive-electrode resin member 70, is referred to as a terminal side-surface joining region E3. Further, an underside part of the positive terminal member 50, formed with the positive terminal lower part 52 in the third direction Q, that is, the entire lower surface 51ay of the long straight portion 51a joined to the positive-resin middle portion 73, is referred to as a terminal lower-surface joining region E4.

As described above, a plurality of joining regions are provided between the positive-electrode resin member 70 and the lid 30 and between the resin member 70 and the positive terminal 50. Some parts of the joining regions of the lid 30 and the positive terminal member 50, which are joined to the resin member 70, are subjected to a roughening process using a laser in advance. The following description will therefore be given to the roughening process.

The roughening process is performed on the lid 30, at a lid upper-surface roughened region F1 extending around and over the whole lid upper-surface joining region E1 on the upper surface 30x and at a lid lower-surface roughened region F2 extending around and over the whole lid lower-surface joining region E2 on the lower surface 30y. In addition, the roughening process is also performed on the positive terminal member 50, at a terminal side-surface roughened region F3 extending around and over the whole lid lower-surface joining region E3 extending over the whole side surfaces of the positive terminal upper part 51 and upper joining portion 53a, which are continuous and flush with each other, and at a terminal lower-surface roughened region F4 just corresponding to the terminal lower-surface joining region E4.

The method for roughening those lid upper-surface roughened region F1, lid lower-surface roughened region F2, terminal side-surface roughened region F3, and terminal lower-surface roughened region F4 is performed by laser irradiation under the conditions described in detail later. In each of these roughened regions F1 to F4, a large number of protrusions is arranged overall in a densely reticulated pattern.

The overall average value of diameters of the numerous protrusions formed in each of the roughened regions F1 to F4 is less than 1 μm on the nano-order. This nano-order size of less than 1 μm means a nanometer (nm) level, i.e., from a few nm to several hundred nm. Further, the condition that protrusions arranged in a densely reticulated pattern means that recesses formed by laser irradiation are two-dimensionally continuous in an almost grid pattern, in which protrusions formed between the recesses are arranged, or raised, at intervals spaced from adjacent ones in plan view with a distance equal to or less than an average diameter of the protrusions. The shape of a grid defining the almost grid shape is not particularly limited and may include any planar shape, such as a diamond shape, other than a rectangular shape.

One example of the method of specifying the overall average diameter of the numerous protrusions in each of the roughened regions F1 to F4 is as follows. A cross-section sample of joined portions between the positive-electrode resin member 70 and the lid 30 or the positive terminal member 50 is prepared first using a predetermined cross-section sample preparing machine (e.g., Cross Section Polisher, manufactured by JEOL Ltd.). Then, the prepared cross-section sample is observed using a Field Emission Scanning Electron Microscope (FE-SEM) to specify the ridge lines between the positive-electrode resin member 70 and the lid 30 or the positive terminal member 50 in the cross-section sample. Based on the specified ridge lines, an overall average diameter of the numerous protrusions in this cross-section sample is measured.

The resin (polyphenylene sulfide in the embodiment) forming the positive-electrode resin member 70 intrudes to the proximal ends of the protrusions. In other words, this resin member 70 is joined to the lid 30 and the positive terminal member 50 at the proximal ends of the protrusions in the roughened regions. Since the resin member 70 is joined, via the proximal ends of the protrusions, to the lid 30 and the positive terminal member 50 as above, it is natural that the resin member 70 is also joined to the lid 30 and the positive terminal member 50 at the distal ends of the protrusions.

Figure 8:
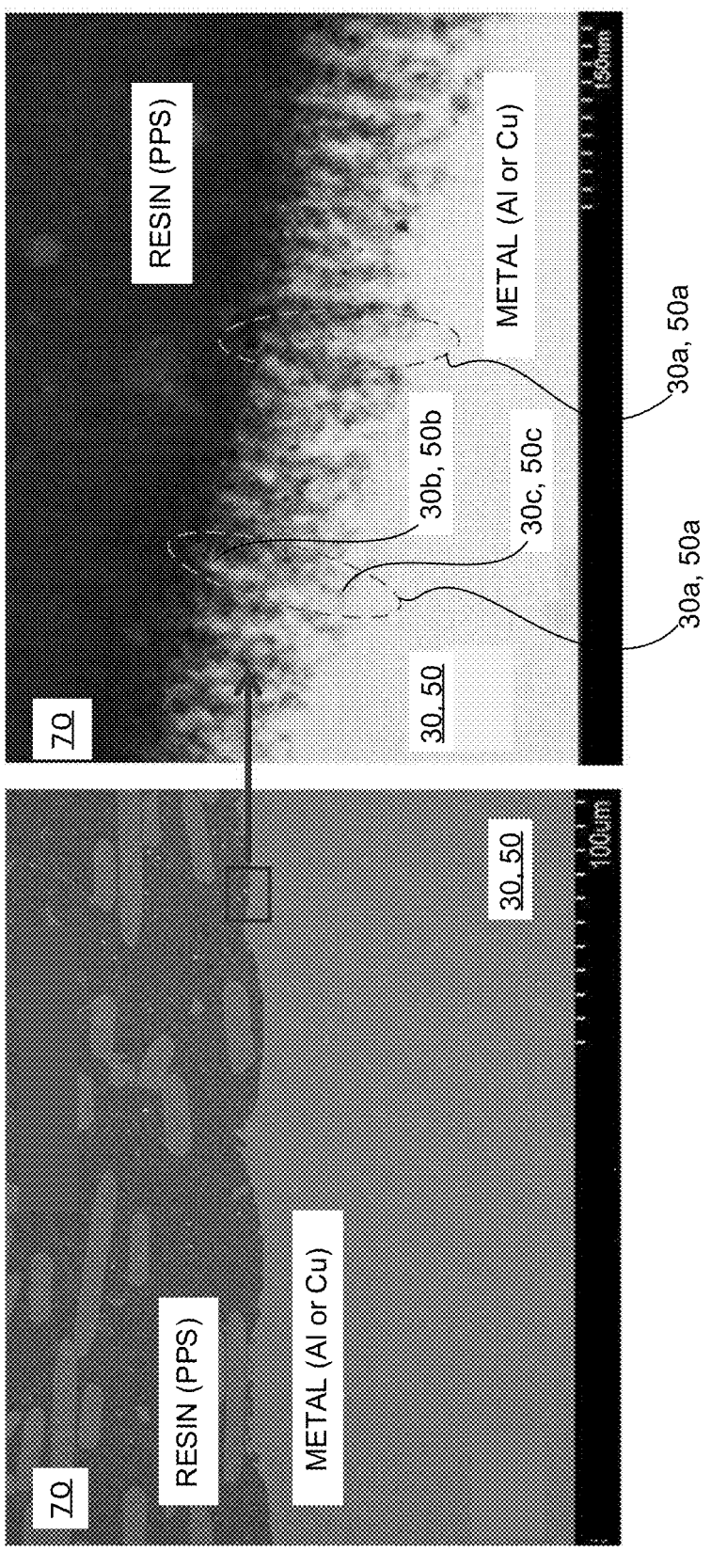
FIG. 8 is images showing that the positive-electrode resin member is formed to proximal ends of protrusions.

Herein, FIG. 8 shows images representing how the protrusions are actually arranged in a densely reticulated pattern on the nano-order level on the lid 30 or the positive terminal member 50, made of metal (aluminum in the embodiment), and the positive-electrode resin member 70 is formed between the distal ends of the protrusions. As shown in FIG. 8, a number of protrusions 30a and 50a are densely arranged in one direction, i.e., the right-left direction in FIG. 8. However, FIG. 8 is a cross-sectional view and hence the protrusions 30a and 50a are densely arranged in two-dimensionally pattern in a plane including the depth direction with respect to FIG. 8. In this FIG. 8, a reference sign 30a denotes protrusions formed in the lid-upper surface roughened region F1 and the lid-lower surface roughened region F2 of the lid 30. Similarly, a reference sign 50a denotes protrusions formed in the terminal side-surface roughened region F3 and the terminal lower-surface roughened region F4 of the positive terminal member 50. For convenience, reference signs 30b and 50b indicate rough locations of the distal ends of the protrusions 30a and 50a and reference signs 30c and 50c indicate rough locations of the proximal ends of the protrusions 30a and 50a in FIG. 8. In the section shown in FIG. 8, the protrusions 30a and 50a have an overall average diameter of 10 to 30 nm.

The overall average value of heights of the numerous protrusions formed in each of the roughened regions F1 to F4 is preferably on the nano-order. However, this overall average value may be on the micro-order. This micro-order size means that the overall average height of the protrusions is on a micrometer (μm) level, i.e., from a few μm to several hundred μm.

The roughening process on the lid 30 and the negative terminal member 60 are similarly configured to that on the lid 30 and the positive terminal member 50 as described above referring to FIGS. 5 to 8. Therefore, the joining structure of the negative-electrode resin member 80 with the lid 30 and the negative terminal member 60 is similar to that of the positive-electrode resin member 70 with the lid 30 and the positive terminal member 50 as described above referring to FIGS. 5 to 8.

Production of Battery

Figure 9:
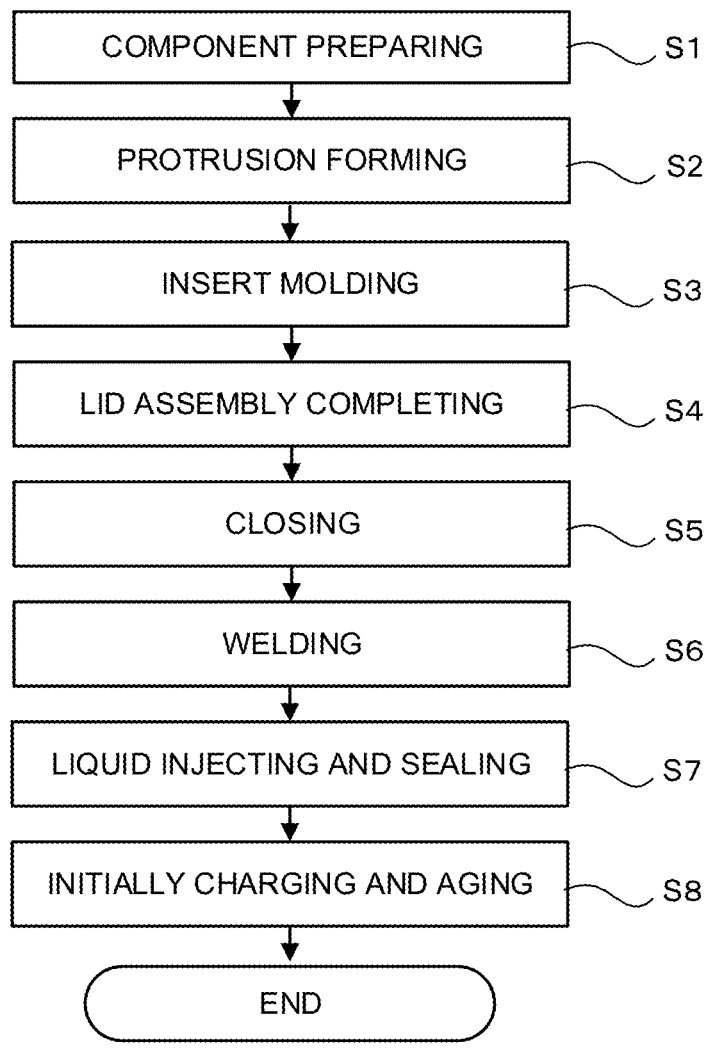
FIG. 9 is a flowchart of a method for producing the battery in the embodiment.

A method for producing the battery 1 will be described below referring to FIG. 9. This producing method for the battery 1 includes a component preparing step S1, a protrusion forming step S2, an insert-molding step S3, a lid assembly completing step S4, a closing step S5, a welding step S6, a liquid injecting and sealing step S7, and an initially charging and aging step S8.

In the component preparing step S1, the lid 30, the positive terminal member 50, and the negative terminal member 60 are prepared. Specifically, the lid 30 is made from an aluminum plate formed with the liquid inlet 30k, the positive-electrode insertion hole 33h, the negative-electrode insertion hole 34h, and the safety valve 19 by use of a conventional general machining method. The positive terminal member 50 is made from an aluminum plate into the shape shown in FIG. 3 by use of a conventional general machining method. Further, the negative terminal member 60 is made from a copper plate into the same shape as the positive terminal member 50 by use of the conventional general machining method.

After the component preparing step S1, the protrusion forming step S2 is performed, in which the lid upper-surface roughened region F1, the lid lower-surface roughened region F2, the terminal side-surface roughened region F3, and the terminal lower-surface roughened region F4 are subjected to the roughening process using laser irradiation to form nano-order protrusions in a densely reticulated pattern on those regions F1, F2, F3, and F4.

Figure 10A:
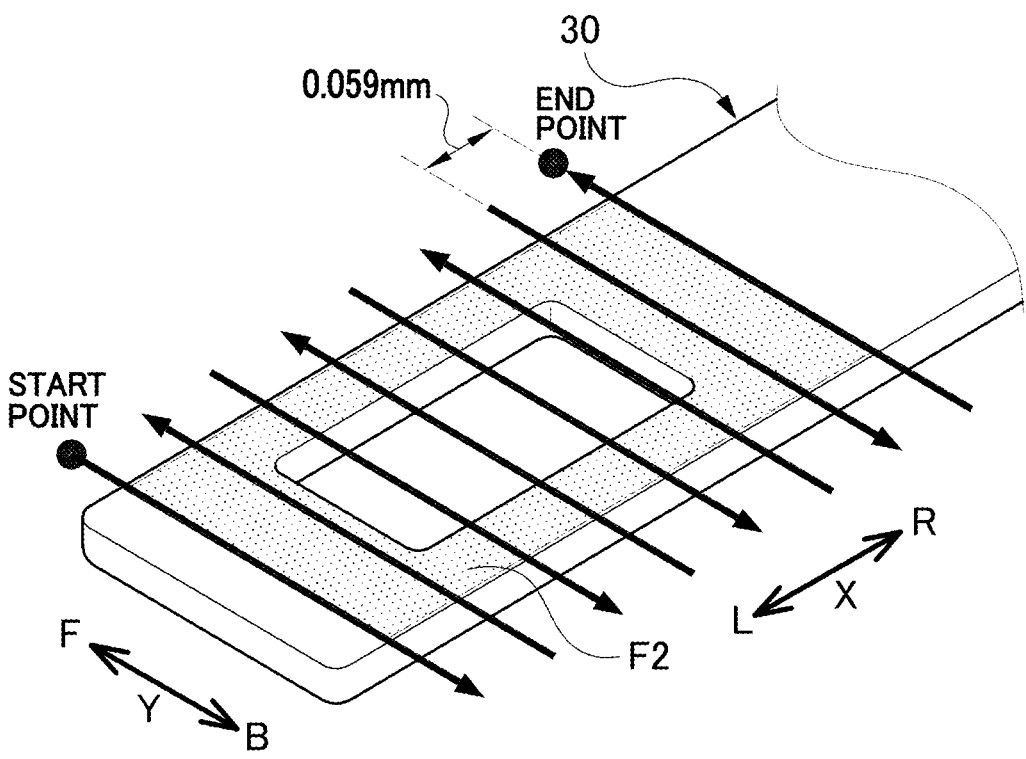
FIG. 10A is a schematic diagram showing a roughening process on a lid lower-surface roughened region.
Figure 10B:
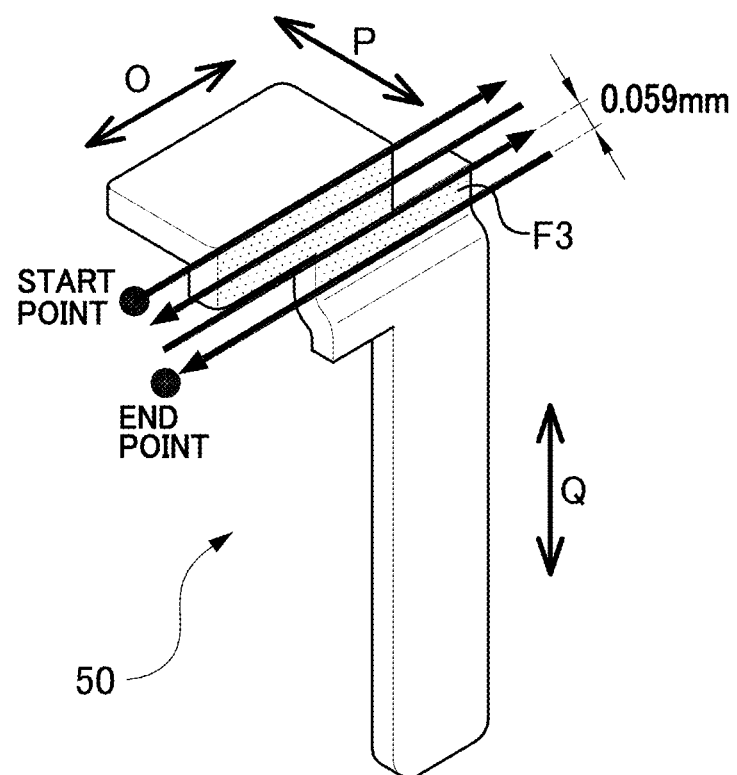
FIG. 10B is a schematic diagram showing a roughening process on a terminal side-surface roughened region.

One example of various conditions of the laser irradiation in the protrusion forming step S2 is as below. The energy density of one pulse of laser irradiation is set to 24 $J/cm^2$ for aluminum and 32 $J/cm^2$ for copper. For example, other laser irradiation conditions for aluminum are set such that a wavelength is 1060 nm, an average output power is 25 W, a pulse period is 40 μs, a pulse width is 50 ns, a spot diameter is 63 μm, a moving speed of a laser beam is 1450 mm/s, and a line pitch is 0.059 mm. FIGS. 10A and 10B are schematic diagram showing the trajectory of a laser beam during the laser irradiation performed on the lid lower-surface roughened region F2 and the terminal side-surface roughened region F3 in the protrusion forming step S2.

As shown in FIG. 10A, the lid lower-surface roughened region F2 is irradiated with a laser beam that is advanced from one end of the region F2 on one side (the left side in FIG. 10A) in the right-left direction X, which is the side indicated by "START POINT" in FIG. 10A, to one side in the front-back direction Y (the back side B in FIG. 10A). Successively, the laser beam is shifted toward the other side in the right-left direction X (the right side R in FIG. 10A) by a set line pitch (0.059 mm) and is advanced again to irradiate the region F2 toward the other side in the front-back direction Y (the front side F in FIG. 10A). Thereafter, this laser irradiation is repeatedly performed by advancing the laser beam to one side or the other side in the front-back direction Y until reaching an end of the region F2 on the other side (the right side R in FIG. 10A) in the right-left direction X, which is the side indicated by "END POINT" in FIG. 10A.

The starting position of the laser irradiation on the lid lower-surface roughened region F2 is not limited to on the side marked with START POINT in FIG. 10A, but may be on the side marked with END POINT in FIG. 10A. The laser irradiation on the lid upper-surface roughened region F1 is also performed in the same manner as the laser irradiation on the lid lower-surface roughened region F2 as illustrated in FIG. 10A. However, the laser irradiation for the lid upper-surface roughened region F1 and the laser irradiation for the lid lower-surface roughened region F2 may be performed in different manners.

As shown in FIG. 10B, the terminal side-surface roughened region F3 is irradiated with a laser beam that is advanced from one end of the region F3 on one side in the third direction Q of the positive terminal member 50, which is the side indicated by "START POINT" in FIG. 10B, to one side of the positive terminal member 50 in the first direction O. Successively, the laser beam is shifted toward the other side of the positive terminal member 50 in the third direction Q by a set line pitch (0.059 mm) and is advanced again to irradiate the region F3 toward the other side in the first direction O. Then, the laser beam is further shifted toward the other side of the positive terminal member 50 in the third direction Q by the set line pitch (0.059 mm) and is advanced again to irradiate the region F3 toward the one side in the first direction O. Thereafter, this laser irradiation is repeatedly performed by advancing the laser beam to one side or the other side in the first direction O until reaching an end of the region F3 on the other side in the third direction Q, which is the side indicated by "END POINT" in FIG. 10B.

The starting position of the laser irradiation on the terminal side-surface roughened region F3 is not limited to on the side marked with START POINT in FIG. 10B, but may be on the side marked with END POINT in FIG. 10B. The laser irradiation on the terminal lower-surface roughened region F4 is also performed in the same manner as the laser irradiation on the terminal side-surface roughened region F3 as illustrated in FIG. 10B. In this case, however, the advancing direction of the laser beam is the same as that for the terminal side-surface roughened region F3, but the starting position and the ending position of the laser irradiation are respectively set to an end on one side and an end on the other side of the terminal lower-surface roughened region F4 in the first direction O of the positive terminal member 50. Furthermore, the laser beam is shifted by a set line pitch (0.059 mm) toward one side or the other side in the second direction P.

In the protrusion forming step S2, furthermore, the laser irradiation is performed on the joining region around the negative-electrode insertion hole 34h of the lid 30 in almost the same manners as for the lid upper-surface roughened region F1 and the lid lower-surface roughened region F2. Similarly, the laser irradiation is performed on the joining region of the negative terminal member 60 in almost the same manners as for the terminal side-surface roughened region F3 and terminal lower-surface roughened region F4. The above term, "almost the same manners", represents almost the same regions to be laser irradiated and almost the same laser irradiation conditions.

Figure 11:
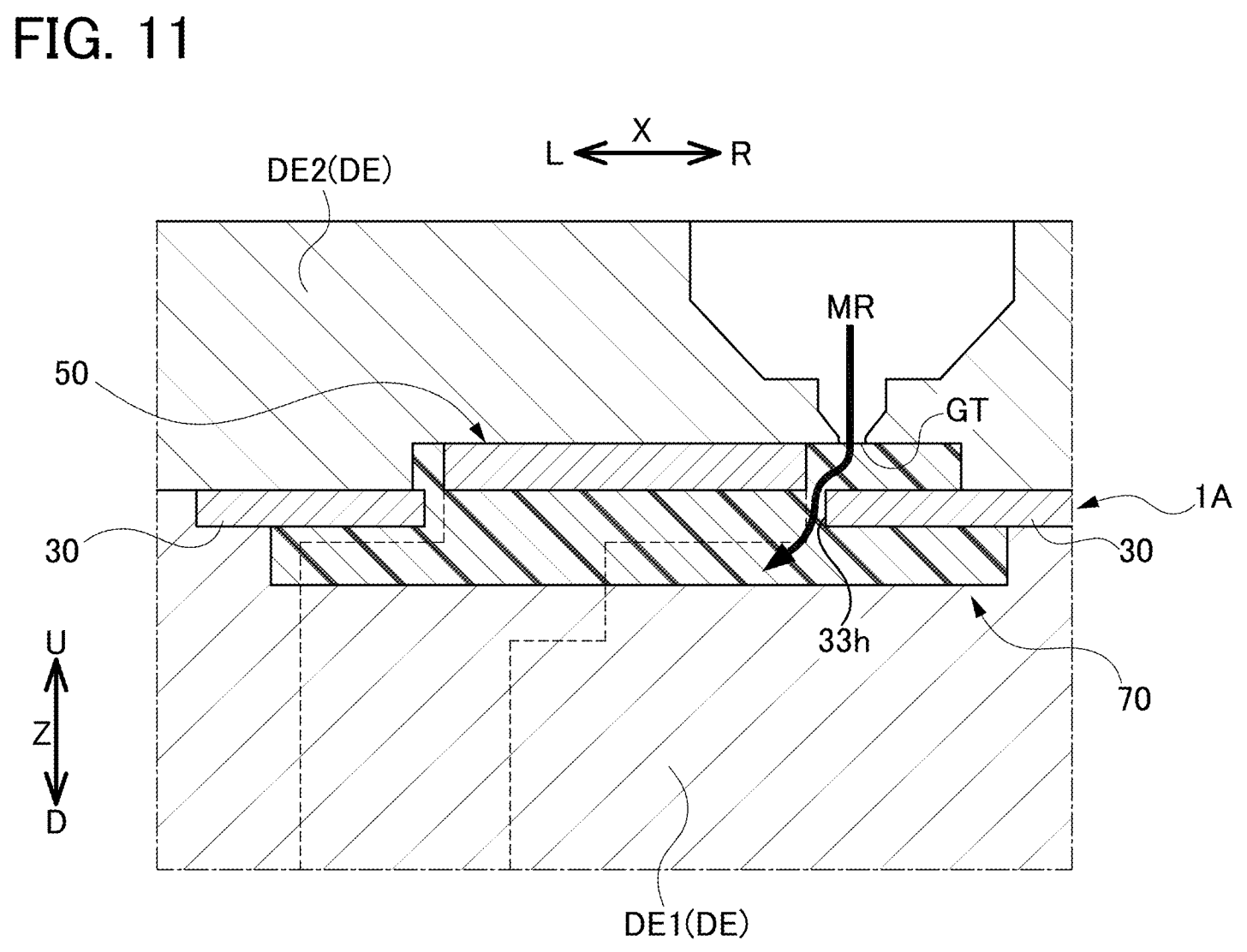

After the protrusion forming step S2, the insert molding step S3 is performed to make the positive-electrode resin member 70 and the negative-electrode resin member 80 so that the positive-electrode resin member 70 is integrally joined to the lid 30 and the positive terminal member 50 and the negative-electrode resin member 80 is integrally joined to the lid 30 and the negative terminal member 60. That is, a unit member 1A, which is a metal-resin composite, is produced. FIG. 11 is an explanatory diagram schematically showing an insert molding step for the positive terminal member 50.

In the insert molding step S3, a mold DE is used, including a lower mold DE1 placed on the lower side and an upper mold DE2 placed on the upper side. These lower mold DE1 and upper mold DE2 are set in place first, and then the lid 30, the positive terminal member 50, and the negative terminal member 60 are put in respective predetermined positions. At that time, the positive terminal member 50 inserted in the positive-electrode insertion hole 33h, the negative terminal member 60 inserted in the negative-electrode insertion hole 34h, and the lid 30 are integrally supported by the mold DE.

Between the lower mold DE1 and the upper mold DE2 set in place, the cavities are formed corresponding to the positive-electrode resin member 70 and the negative-electrode resin member 80. As shown in FIG. 11, a molten resin MR, which is the material for forming the positive-electrode resin member 70 and the negative-electrode resin member 80, is injected into the cavities defined by the lower mold DE1 and the upper mold DE2 through the gate member GT formed in the upper mold DE2. After the injection of the molten resin MR is completed, this resin is appropriately cooled to form the positive-electrode resin member 70 and the negative-electrode resin member 80. Subsequently, the upper mold DE2 is moved upward, and the unit member 1A consisting of the integrated lid 30, positive-electrode resin member 70 and positive terminal member 50, and negative-electrode resin member 80 and negative terminal member 60 is released from the lower mold DE1.

Subsequent to the insert molding step S3, the lid assembly completing step S4 is performed to complete a lid assembly. Specifically, the electrode body 40 is prepared, and the positive terminal lower part 52 and the negative terminal lower part 62 of the unit member 1A produced in the insert molding step S3 are respectively connected by welding to the positive current collecting part 41r and the negative current collecting part 42r of the electrode body 40. The electrode body 40 in this state is then enclosed with the insulating holder 5. Accordingly, the lid assembly consisting of the lid 30, positive terminal member 50, negative terminal member 60, positive-electrode resin member 70, negative-electrode resin member 80, electrode body 40, and insulating holder 5 is completed.

Next to the lid assembly completing step S4, the closing step S5 is performed, in which the case body 20 is prepared, and a lower part of the lid assembly completed in the lid assembly completing step S4, including the electrode body 40 and the insulating holder 5 and others located under the lid 30, is inserted in the case body 20, and then the opening 21 of the case body 20 is closed with the lid 30.

After the closing step S5, the welding step S6 is performed, in which each end portion of the front side part 13, back side part 14, left side part 15, and right side part 16 of the case body 20, on the upper side U in the upper-lower direction Z, is laser welded to the peripheral edge portion of the lid 30 over the entire circumference to hermetically seal the opening 21.

After the welding step S6, the liquid injecting and sealing step S7 is performed, in which the electrolyte 3 is injected, or poured, into the case 10 through the liquid inlet 30k, so that the electrode body 40 is impregnated with the electrolyte 3. Then, the sealing member 39 is fitted into the liquid inlet 30k from above and welded to the lid 30 over the entire circumference to hermetically seal between the sealing member 39 and the lid 30.

After the liquid injecting and sealing step S7, the initial charging and aging step S8 is performed, in which the battery 1 is connected to a charging device (not shown) and initially charged. This initially charged battery 1 is then left to stand for a predetermined time to age. Thus, the battery 1 is completed.

In the battery 1 including the unit member 1A in which each of the lid 30 and the positive terminal member 50, which are made of metal, and the positive-electrode resin member 70 made of resin are joined, the lid 30 and the positive terminal member 50 are respectively formed, on their surfaces, with the protrusions 30*a* and the protrusions 50*a*, which have an average diameter of less than 1 μm on the nano-order and are arranged in a densely reticulated pattern, and the resin forming the positive-electrode resin member 70 intrudes into each gap between at least the distal ends of the adjacent protrusions 30*a* and between at least distal ends of the adjacent protrusions 50*a*, so that the resin member 70 is joined to at least the distal ends of the protrusions 30*a* and the distal ends of the protrusions 50*a*. For example, the above configuration can enhance the anchor effect and hence increase the joining strength between the positive-electrode resin member 70 and each of the lid 30 and the positive terminal member 50, as compared with joining between the metal member formed with protrusions having an average diameter on the micro-order and the resin member. Furthermore, this configuration can enhance the sealing property between the positive-electrode resin member 70 and each of the lid 30 and the positive terminal member 50. In the battery 1, the lid 30 and the negative terminal member 60, which are made of metal, and the negative-electrode resin member 80 made of resin are joined, so that this configuration can also increase the joining strength between the negative-electrode resin member 80 and each of the lid 30 and the negative terminal member 60. Furthermore, this configuration can enhance the sealing property between the negative-electrode resin member 80 and each of the lid 30 and the negative terminal member 60. In addition, the resin forming the positive-electrode resin member 70 intrudes into each gap between at least proximal ends of the adjacent protrusions 30*a* and between at least proximal ends of the adjacent protrusions 50*a*, so that the resin member 70 is joined to the proximal ends of the protrusions 30*a* and the proximal ends of the protrusions 50*a*. Thus, the above configuration can further enhance the anchor effect and hence increase the joining strength between the positive-electrode resin member 70 and each of the lid 30 and the positive terminal member 50, as compared with joining to the distal ends. Furthermore, the sealing strength between the positive-electrode resin member 70 and each of the lid 30 and the positive terminal member 50 can be even further enhanced. In the battery 1, the lid 30 and the negative terminal member 60, which are made of metal, are joined to the negative-electrode resin member 80 made of resin, so that this configuration can also increase the joining strength between the negative-electrode resin member 80 and the each of the lid 30 and the negative terminal member 60. Furthermore, this configuration can further enhance the sealing property between the negative-electrode resin member 80 and each of the lid 30 and the negative terminal member 60.

The foregoing embodiments are mere examples and give no limitation to the disclosure. Accordingly, the disclosure may be embodied in other specific forms without departing from the essential characteristics thereof. Several examples of modifications and variations of this embodiment will be described below.

The aforementioned embodiment exemplifies the flat wound electrode body 40 as an electrode body housed in the case 10, but alternately may adopt a laminated electrode body. In the foregoing embodiment, a single electrode body is housed in the case 10, but a plurality of electrode bodies may be accommodated together in the case 10.

In the above-described embodiment, the case 10 has an overall flat and bottomed rectangular parallelepiped shape, but the shape of this case 10 may be changed appropriately, e.g., to another shape such as a columnar shape. Moreover, one or both of the positive terminal member 50 and the negative terminal member 60 may be changed appropriately to any other shapes. Similarly, one or both of the positive-electrode resin member 70 and the negative-electrode resin member 80 may be changed appropriately to any other shapes. The positive terminal member 50 and the negative terminal member 60 in the above-described embodiment have the same shape, but may have different shapes. Similarly, the positive-electrode resin member 70 and the negative-electrode resin member 80 in the above-described embodiment have the same shape, but may have different shapes.

In the above-described embodiment, the battery 1 configured such that the metal lid 30 and the metal positive terminal member 50 are each joined to the positive-electrode resin member 70 and also the metal lid 30 and the metal negative terminal member 60 are each joined to the negative-electrode resin member 80 is included in the metal-resin composite of the disclosure. Further, the unit member 1A constituting the battery 1 is also included in the metal-resin composite of the disclosure.

In the foregoing embodiment, the disclosure is applied to the lithium-ion secondary battery. However, the disclosure is applicable to any general power storage devices, for example, nickel-metal hydride batteries and nickel-cadmium batteries. The application of the disclosure is not limited to batteries, but is widely applicable to any composites in which a metal member and a resin member are joined to each other.

REFERENCE SIGNS LIST

1 Battery
10 Case
20 Case body
30 Lid
33*h* Positive-electrode insertion hole
34*h* Negative-electrode insertion hole
50 Positive terminal member
60 Negative terminal member
70 Positive-electrode resin member
80 Negative-electrode resin member
30*a*, 50*a* Protrusion
E1 Lid upper-surface joining region
E2 Lid lower-surface joining region
E3 Terminal side-surface joining region
E4 Terminal lower-surface joining region
F1 Lid upper-surface roughened region
F2 Lid lower-surface roughened region
F3 Terminal side-surface roughened region
F4 Terminal lower-surface roughened region

What is claimed is:

1. A metal-resin composite, comprising:

a metal member; and a resin member directly joined to the metal member, wherein the metal member has a surface on which protrusions are formed with an average diameter of less than 1 μm on a nanometer order and arranged adjacent to and spaced from one another, resin that forms the resin member intrudes into each gap between distal ends of the adjacent protrusions of the metal member so that the resin member is joined to at least the distal ends of the protrusions of the metal member, the protrusions are formed on a plurality of recesses that are two-dimensionally continuous in a grid pattern, and arranged at intervals to be adjacent to and spaced from one another by a distance equal to or less than an average diameter of the protrusions, and the resin intrudes into a gap between proximal ends of the adjacent protrusions of the metal member so that the resin member is joined to the proximal ends of the protrusions of the metal member.

2. A method for producing the metal-resin composite according to claim 1, the method comprising:

forming the protrusions on the surface of the metal member by irradiating the metal member with a laser; and after forming the protrusions, insert-molding the resin member in a region where the protrusions are formed on the surface of the metal member.

\* \* \* \* \*